Patented July 7, 1931

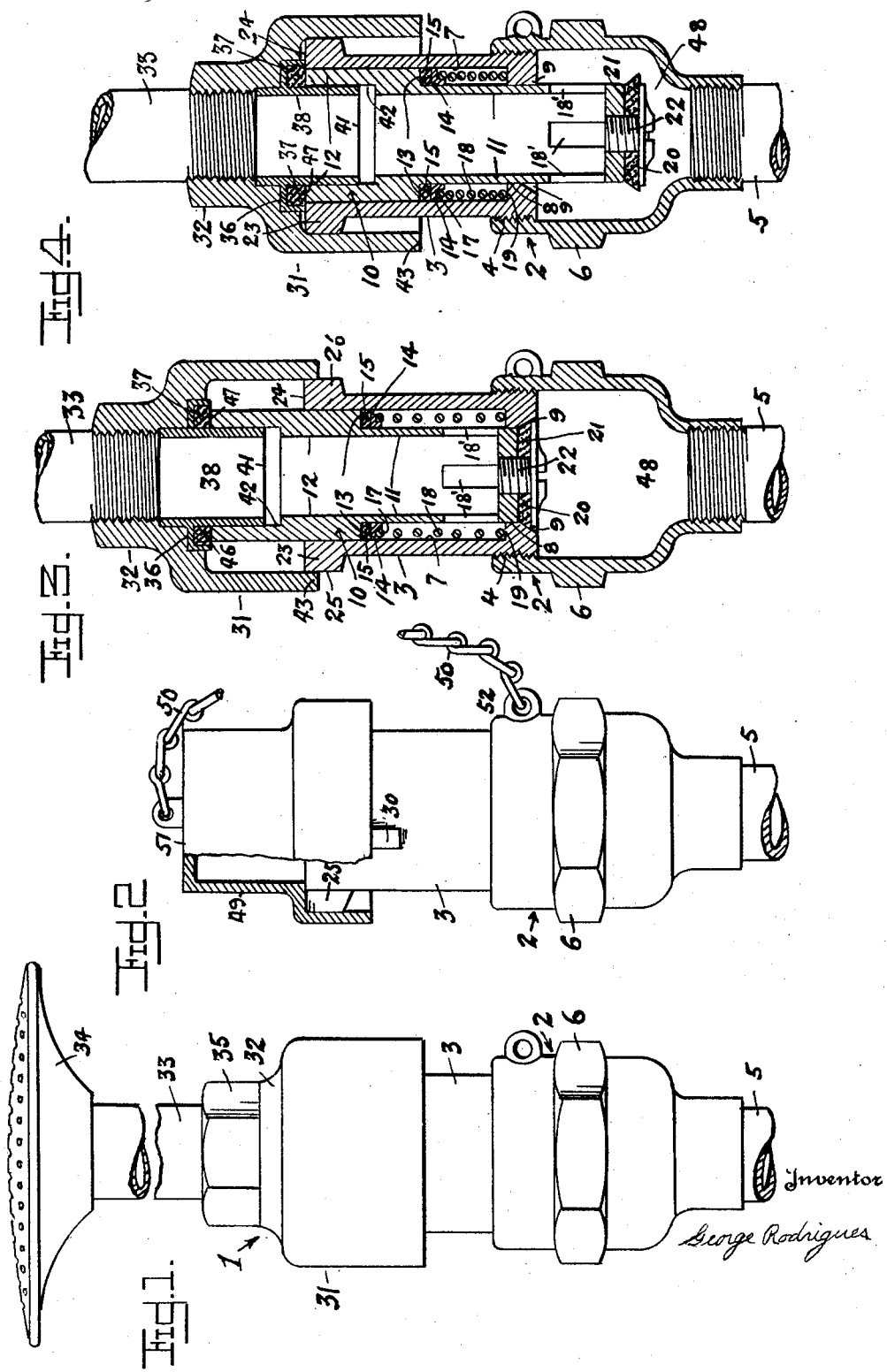
July 7, 1931. G. RODRIGUES 1,813,581
VALVE
Filed May 21, 1929  2 Sheets-Sheet 1
Inventor
George Rodrigues

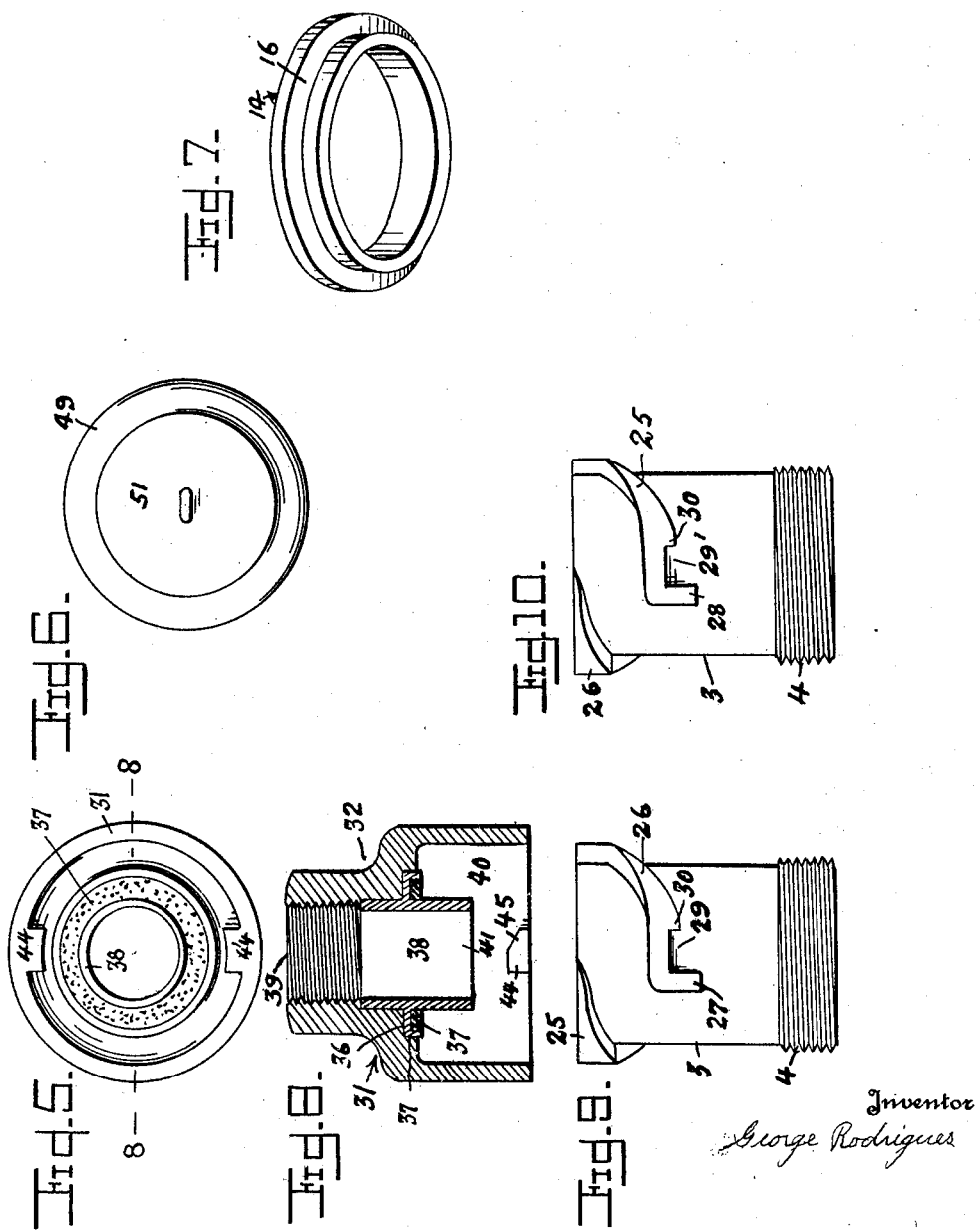

1,813,581

UNITED STATES PATENT OFFICE

GEORGE RODRIGUES, OF CASTROVILLE, CALIFORNIA

VALVE

Application filed May 21, 1929. Serial No. 364,764.

This invention relates to improvements in valves for lawn sprinklers and the like and has for its object to provide means whereby water pressure in the water line will lock the valve in closed position.

A further object of the invention is to provide in a sprinkler head valve or the like, a combined spring and water pressure closure means for the valve.

A still further object of the invention is to provide in a plunger type valve a screw cap adapted to hold the plunger in operative position.

With the above and such other objects in view as may hereinafter more fully appear, I have invented the device shown in the accompanying drawings in which:

Figure 1 is an elevational view of my device having a sprinkler head attached thereto;

Figure 2 is a similar view showing the sprinkler head and valve cap removed and protecting cap substituted therefor;

Figure 3 is a vertical mid-section of Figure 1 with the valve in closed position;

Figure 4 is a similar section of Figure 1 with the valve in open position;

Figure 5 is a bottom plan view of a valve operating cap;

Figure 6 is a top plan view of Figure 2;

Figure 7 is a perspective view of a spring positioning and packing washer;

Figure 8 is a section on line 8—8 of Figure 5;

Figures 9 and 10 are side elevations from opposite sides of the valve cylinder, illustrating the construction of the valve actuating spiral ribs.

Like reference characters indicate like parts throughout the following specification and in the several views in the drawings in which 1 indicates a sprinkler head valve embracing a union 2 for connecting the valve cylinder 3, through screw threaded connection 4, with a water supply line, the member 2, having a polysided portion 6, whereby it may be operated by means of a wrench. The cylinder 3 is provided with a bore 7, of relatively large diameter and having a reduced lower inlet 8, terminating in a bevelled valve seat 9. Seated within the cylinder 3, is a cylindrical plunger 10, the diameter of the lower portion 11 of which is substantially the same as the reduced opening 8 of the bore 7, while its upper portion 12 is of a diameter equal to the diameter of the bore 7, whereby an annular shoulder 13 is formed against which the packing washer 15 is held seated by means of a washer 14 surrounding the reduced plunger 11, said washer 14 being provided with a rabbeted portion 16 to receive the upper end 17 of the spring 18 coiled around the portion 11, of plunger 10, the other end of said spring seating upon the shoulder 19 formed around the reduced opening 8 whereby the valve packing 20 secured to the bottom wall 21 of the member 11, is normally held in tight engagement with the valve seat 9, said member 20 being secured to the bottom 21 by means of an enlarged headed screw 22. The upper end 12 of the plunger 10 projects a considerable distance above the upper enlarged head 23 of the cylinder 3, said head 23 providing a shoulder 24, surrounding said projecting end 12. Cast upon the outer surface of the member 3, are diametrically opposing spirals 25 and 26 terminating in right angular stubs 27 and 28, recesses 29 and 29' being provided under said spirals said recesses being peripherally formed by the lugs 30, projecting below the under-surface of said spirals 25. Within the cap 31 is an annular recess in which is the gland and annular packing 37 surrounding the plunger-controlled cylinder 38, the upper end of said cylinder projecting into the reduced opening through said cap 31, while the lower portion depends into the mouth 42 of the projecting end 12 of the plunger 10 when the cap 31 is placed upon the member 3. The diameter of the lower portion 43 of the cap 31, is such as to permit the same to slip over the shoulder 24 whereby the lugs 44 internally of the cap portion 43 may, by means of their inclines 45 slide beneath the spirals 25 and 26 thus, when the cap 31 is rotated upon the member 3, the cap is forced inwardly through the action of said spirals upon said lugs 44, and against the tension of the spring 18, thus causing the packing 46, within the gland 37 to press upon the upper edge 47 of the member 10 thus forcing the plunger 10 down against the tension of the said spring 18, and forcing its lower end through the opening 8, and into the chamber 48, of the union 2, until the openings 18' of the cylinder 10 come entirely within the chamber 48, whereby water passing in through the pipe 5, will flow through the openings 18; and through the cylindrical plunger 10, and out through the sprinkler head 34. When the valve is not in use and the sprinkler head and cap 31 removed from the same, the protecting cap 49, of substantially the same shape as the cap 31, is provided to form a closure for the cylinder 10 whereby dirt and foreign matter is kept out of the said cylinder. A chain 50 attached to the top wall 51 of said cap 49 is secured to the eye 52 of the member 2.

The lugs 30 form a locking stop to prevent the retrograde movement of the member 31, but the device can be readily unlocked by a slight downward movement against the resistance of the spring 18.

Hving described my invention that which I claim to be new and desire to procure by Letters Patent is:

1. A plunger type valve including a shell, a pipe union to which the shell is threaded, a hollow cylindrical plunger having a closed bottom movable in the shell and adapted to be projected into the said union, said shell having a valve seat through which said plunger operates, a valve member carried by the lower end of said plunger, and a spring coiled around said plunger adapted to hold the valve normally closed, said cylindrical plunger having a series of openings adjacent its lower end and means whereby said lower end may be projected below said valve seat, and into said union, said means including a cap for said valve member, spirals on the outer side of said shell, lugs within said cap for engagement by said spirals, and a sprinkler head carried by said cap, said plunger having an enlarged upper end normally projecting beyond said shell, said cap having a cylinder adapted to seat within said projecting end.

2. The combination set forth in claim 1, said cap having an annular packing gland for engagement with the upper edge of said cylinder making a water tight connection between said cap and cylinder.

In testimony whereof I affix my signature.

GEORGE RODRIGUES.